US011102601B2

(12) United States Patent
Pinto et al.

(10) Patent No.: US 11,102,601 B2
(45) Date of Patent: Aug. 24, 2021

(54) SPATIAL AUDIO UPMIXING

(71) Applicant: Apple Inc., Cupertino, CA (US)

(72) Inventors: Stephen E. Pinto, Sunnyvale, CA (US); Christopher T. Eubank, San Francisco, CA (US); Matthew S. Connolly, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/645,433

(22) PCT Filed: Sep. 28, 2018

(86) PCT No.: PCT/US2018/053432
§ 371 (c)(1),
(2) Date: Mar. 6, 2020

(87) PCT Pub. No.: WO2019/067904
PCT Pub. Date: Apr. 4, 2019

(65) Prior Publication Data
US 2020/0288259 A1 Sep. 10, 2020

Related U.S. Application Data

(60) Provisional application No. 62/566,239, filed on Sep. 29, 2017.

(51) Int. Cl.
*H04S 7/00* (2006.01)
*G06F 3/16* (2006.01)
*H04S 3/00* (2006.01)

(52) U.S. Cl.
CPC ............ *H04S 7/302* (2013.01); *G06F 3/165* (2013.01); *H04S 3/008* (2013.01); *H04S 2400/01* (2013.01); *H04S 2400/11* (2013.01)

(58) Field of Classification Search
CPC . H04S 3/008; H04S 7/302; H04S 7/40; H04S 2400/01; H04S 2400/11; G06F 3/165; H04R 25/43
(Continued)

(56) References Cited

U.S. PATENT DOCUMENTS 5,335,011 A * 8/1994 Addeo ............... H04N 7/15 348/14.1
6,507,658 B1 * 1/2003 Abel ................. H04S 3/00 381/17
(Continued)

FOREIGN PATENT DOCUMENTS

WO 2016126715 8/2016

OTHER PUBLICATIONS

International Preliminary Report on Patentability for International Application No. PCT/US2018/053432 dated Apr. 9, 2020, 10 pages.
(Continued)

*Primary Examiner* — Xu Mei
(74) *Attorney, Agent, or Firm* — Womble Bond Dickinson (US) LLP

(57) ABSTRACT

Spatial audio upmixing enables mixing spatial sound on a more granular per-channel level than is possible using conventional upmixing. A spatial bed is a multi-channel audio content that represents a complete sound field description, e.g., a virtual sphere of sound, for example surrounding a simulated reality listener in a simulated reality environment. A new spatial bed is generated by combining sections of at least two of such spatial beds. Other embodiments are also described and claimed.

22 Claims, 4 Drawing Sheets

(58) Field of Classification Search
USPC .................. 381/303, 309, 310, 20, 23, 119
See application file for complete search history.

(56) References Cited

U.S. PATENT DOCUMENTS

| | | | |
|---|---|---|---|
| 7,640,069 B1 | 12/2009 | Johnston | |
| 9,552,819 B2* | 1/2017 | Thompson | G10L 19/008 |
| 10,448,178 B2* | 10/2019 | Tawada | G10L 21/10 |
| 2009/0116652 A1 | 5/2009 | Kirkeby et al. | |
| 2011/0153043 A1* | 6/2011 | Ojala | H04S 1/002 |
| | | | 700/94 |
| 2015/0124973 A1* | 5/2015 | Arteaga | G10L 19/008 |
| | | | 381/22 |
| 2015/0189457 A1* | 7/2015 | Donaldson | H04M 3/56 |
| | | | 381/1 |
| 2017/0098452 A1 | 4/2017 | Tracey et al. | |
| 2019/0354344 A1* | 11/2019 | Chen | G06F 3/167 |
| 2020/0186957 A1* | 6/2020 | DiVerdi | H04S 7/40 |

OTHER PUBLICATIONS

International Search Report and Written Opinion for International Application No. PCT/US2018/053432 dated Dec. 19, 2018, 16 pages.

Schultz-Amling, Richard, et al., "Acoustical Zooming Based on a Parametric Sound Field Representation", Audio Engineering Society Convention Paper 8120, May 22, 2010, 9 pages.

Herre, Jurgen, et al., "MPEG-H Audio—The New Standard for Universal Spatial/3D Audio Coding", Audio Engineering Society Convention Paper 9095, Oct. 9, 2014, 12 pages.

Hollerweger, Florian, "An Introduction to Higher Order Ambisonic", Oct. 2008, 13 pages.

"Dolby Atmos Next-Generation Audio for Cinema", White Paper, 2014, 18 pages.

* cited by examiner

SPATIAL AUDIO UPMIXING

This nonprovisional patent application claims the benefit of the earlier filing date of U.S. provisional application No. 62/566,239 filed Sep. 29, 2017.

TECHNICAL FIELD

The technical field relates generally to computerized data processing systems and methods for audio processing, and in particular to spatial audio processing.

BACKGROUND

Producing three-dimensional (3D) sound effects in augmented reality (AR), virtual reality (VR), and mixed reality (MR) applications, all of which in this disclosure are encompassed by the term simulated reality (SR) applications, is commonly used to enhance media content. Examples of spatial audio formats designed to produce 3D sound include MPEG-H (Moving Picture Experts Group) 3D Audio standards, HOA (Higher-order Ambisonics) spatial audio techniques, and DOLBY ATMOS surround sound technology. For example, sound designers add 3D sound effects by manipulating sounds contained in spatial audio objects to enhance a scene in an SR application, where the sounds are ambient sounds and/or discrete sounds that through spatial audio processing can be virtually located anywhere in the virtual 3D space created by the SR application.

SUMMARY

Embodiments of spatial audio upmixing are described here that enable SR application developers to custom mix together into a single, new (output) audio object sound from different input audio objects, where each input audio object may contain sounds of a different scene. Among other advantages, the spatial audio upmixing techniques enable the mixing of spatial sound on a more granular per-channel level than is possible using conventional upmixing.

In one embodiment, the audio objects contain audio data encoding a sound capable of being composed into the SR application. In one embodiment the audio data encoding the sound is stored as a spatial audio object that preserves spatial characteristics of a recorded sound, the spatial audio object having a plurality of channels of audio data each of which may be associated with any one or more of a direction and a location of the recorded sound. In one embodiment, the sound encoded in the audio data is any recorded sound, including a non-spatial mono recording, that has been projected uniformly onto a spatial bed, e.g., onto a uniformly spaced grid array of virtual sound sources (virtual speakers). In one embodiment, the plurality of channels of audio data in a spatial audio object comprise such a spatial bed. The spatial bed is a multi-channel audio content that represents a complete sound field description (4π steradian of a sphere surrounding a central listening position), also referred to as a spherical array of virtual sound sources or a virtual sphere of sound, that may surround an SR listener in an SR environment.

In one embodiment, a computer-implemented method for creating a custom mix of different portions of spatial audio objects may include the following operations. A plurality of input spatial audio objects are obtained, e.g., as part of a spatial audio library. A selection of a first input object, as one of the plurality of input spatial audio objects, is received, e.g., through a user interface and from a sound designer. A selection of a first portion of a custom mix visualization (e.g., a graphical object such as a sphere) where sound of the selected first input object is to be rendered is also received, e.g., via the user interface and the sound designer. A selection of a second input object, as another one of the plurality of input spatial audio objects, is also received in the same manner. Furthermore, a selection of a second portion of the custom mix visualization where sound of the selected second input object is to be rendered, is also received (e.g., in the same manner, via the user interface). A scene combiner process then generates, e.g., updates, a new spatial audio object based on the selections.

The new spatial audio object may comprise a spherical array of virtual sound sources (virtual sphere) that define a sound field surrounding a listening position of the new spatial audio object, e.g., at a center of the custom mix sphere. In another embodiment, the virtual sphere defines a sound field that radiates outward (rather inward). The new object's virtual sphere may have the same virtual sound source grid as each of the input objects. In this manner, a selected portion of the channels that make up the selected first input object may "paint" or become a corresponding portion of the virtual sphere of the new object (and similarly for a selected portion of the selected second input object. The two portions may or may not overlap in terms of virtual sound sources of the new object that produce their respective sounds.

In one embodiment, a selected portion (section) of an input spatial audio object is added to the custom mix, which may be represented by a portion (not all) of a visualized globe that represents the input spatial audio object (spatial bed). The selected portion may be the one that is directly facing the sound designer (as displayed by the user interface). The sound associated with that portion may be emphasized relative to sound of the other portions of the input spatial audio object, when adding into the new spatial audio object. The portion that is emphasized may automatically change in response to the sound designer reorienting the globe that represents the input object (when about to select a portion to be added to the custom mix).

The process may also visualize the new spatial audio object (new spatial bed) as a separate, new globe, e.g., in an SR environment, displaying the surface of the new globe from the point of view of the sound designer who may be inside the new globe, e.g., at the center, or outside the new globe. This may be presented in the SR environment as a virtual hand of the sound designer reaching out and painting with a handheld brush or spray device the inside of (or the outside of) a wall of the new globe, where the selected sound (of the input spatial audio object) is to be rendered.

In one embodiment, the portion of the visualized new globe selected by the sound designer (to receive the sound from a particular input object) may be an irregular spherical shape, or it may be the outer surface of a spherical wedge (e.g., as "painted" from inside the globe or from outside the globe), or it may be the outer surface of a spherical sector.

In one embodiment, the portion of the input object that is combined into the custom mix may be defined as a function of solid angle of the visualized globe representing the input object.

In one embodiment, the new spatial bed contains at least two portions of at least two of the plurality of input spatial beds, respectively, that are positioned side by side on the surface of the new globe. In another embodiment, the two portions are overlaid, e.g., by summing their corresponding (coinciding) virtual sources. In yet another embodiment, the sound designer can specify that a particular sound effect be applied to one or both of the portions of the input objects. The sound effect may be designed to alter the listener's perception of the sound field, and may be as simple as for example reducing the sound volume (e.g., a scalar gain) of a selected portion of the virtual sphere, or it may be more complex and can include any type of timbral effects applied to the selected section of the virtual sphere, e.g. spectral shaping such as low pass filtering, dynamic range control, reverberation, etc.

The various systems, apparatuses and methods described herein can be performed by one or more data processing systems to create new spatial audio objects for use in an SR environment.

The methods and systems described herein can be implemented by data processing systems, such as server computers, desktop computers and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine-readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
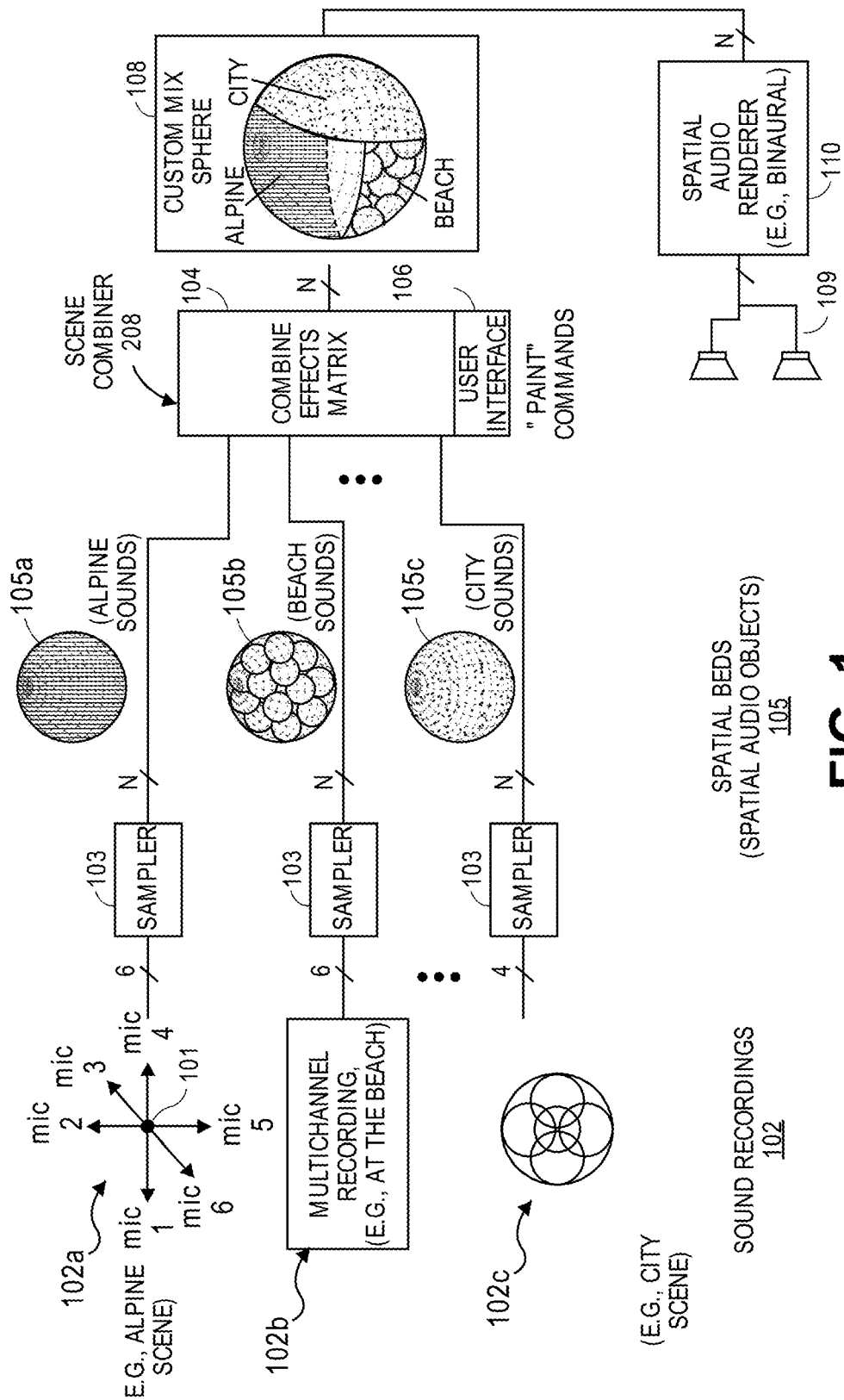
FIG. 1 is a block diagram illustrating an overview of spatial sound upmixing in accordance with one or more embodiments described herein.

Various embodiments or aspects will be described with reference to details, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Physical Setting

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

Simulated Reality

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

Virtual Reality

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Mixed Reality

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

Augmented Reality

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Augmented Virtuality

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Hardware

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

FIG. 1 illustrates an overview of a spatial sound mixing process for producing a custom mix of composed spatial sound according to the wishes of a sound designer, as a new spatial audio object 108. A goal here is to "upmix" different portions of various spatial audio recordings 102 that are available into a custom mix, where the sound designer could simply "paint" a desired portion of a given recording 102 (using a brush or spray can for example) onto a desired part of the surface of a custom mix sphere. Note that the term custom mix sphere refers to a visualization of the new spatial audio object 108 that more generally encompasses a topological sphere, a globe, or any polyhedron that depicts a nature of the new spatial audio object 108 as defining an array of virtual sound sources that surround a generally central listening position.

The process may start with an available set of spatial sound recordings 102 that may be stored in an audio library. As seen in the example of FIG. 1, there may be a six-channel microphone recording 102a of a location in the mountains, a multi-channel audio recording 102b at a beach, and a spherical harmonics encoded version (e.g., HOA format, such as B-format having channels WXYZ) of a sound field recording 102c made in a crowded city. Each of these example recordings may have been made with respect to a central origin 101 that may be deemed a listening position (for each recording.) Note that synthesized sounds may be added to a channel of a given recording 102.

The audio data in each sound recording 102a, 102b, 102c, . . . are then sampled by a sampler 103 onto, or projected onto, a number of virtual sound sources or speakers, N, that are on a spherical grid. This may be a virtual speaker array of N uniformly spaced virtual sources on a sphere. This projection of a multichannel recording (e.g., a spherical harmonics encoded version) onto a defined, spherical grid of N virtual sources is designed to preserve the spatial cues contained in each original recording 102. In many instances, N will be greater than the number of channels in a given recording 102, and in such cases the sampler 103 may be referred to as an upsampler or an upmixer. The result is a respective spatial audio object 105a, 105b, . . . for each of the sound recordings 102a, 102b . . . , each of which may have the same spatial audio format, using the same spherical grid of N virtual sources (but of course with different audio signal gains across the virtual sources, as computed by the projection). The spatial audio object is also referred to here as a spatial bed of multichannel content.

In one embodiment, e.g., as part of SR application development platform, a visualization of each of the input spatial audio objects 105 is generated (and displayed to a sound designer on a computer screen) as a globe that may have a different shading or outer skin. For example, the outer skin of each globe may display an image (e.g., a still picture or an animated sequence of video) representative of its recorded sound scene (e.g., trees for the alpine scene, waves for the beach scene, and people on a busy side walk for the city scene).

Each input spatial audio object 105 may comprise multichannel audio content as a spherical array of virtual sound sources (also referred to as a sphere of virtual sources). The virtual sound sources of each input object 105 and of the new spatial audio object 108 may be on the same N element spherical grid array, and may surround a common listening position that may be at the center of the N element spherical grid. A scene combiner 208 may perform a matrix arithmetic process referred to as a combine effects matrix 104 that may combine the three sets of virtual sources of in this case the three input audio objects 105a-105c that have been selected by a user (e.g., sound designer) through a user interface 106. Those three are combined according to three spray paint control commands, respectively, received from the user through the user interface 106. The combine effects matrix 104 process may then produce a sum of the three sets of virtual sources of the three input objects 105, as part of the new spatial audio object 108. In this example, the spatial audio objects 105a, 105b, 105c containing an alpine sound scene, a beach scene and a city scene are to be mixed by a scene combiner 208 into the new spatial audio object 108 that may be visualized to the sound designer as a custom mix sphere (globe). The portions of the custom mix sphere that will have the sounds as selected by the user are shaded or illustrated, to show the alpine, beach and city images as seen in the figure. In this particular example, the user has selected alpine sound for the far sector, city sound for a spherical cap that extends vertically, and beach sound for a lower sector in between the city and alpine sounds.

The new spatial audio object 108 which contains such composed spatial sound (as a result of the "upmixing" of the several input audio objects by the combine effects matrix 104 process) can then be rendered by a spatial audio renderer 110 for output as spatial sound through a particular speaker system 109. The rendering may be binaural rendering, for spatial sound output through the speaker system 109 having headphones worn by the sound designer, or it may be a combination of binaural rendering through a headset and in the presence of one or more loudspeakers in a room. The user wearing the headset may be assigned by the renderer to a listening position which may be at the center of the spherical virtual loudspeaker array of the new spatial audio object 108. Head tracking may be used by the binaural renderer as part of an SR environment that displays visualizations of the different sound scenes represented on the surface of the custom mix sphere, as if the sound designer were inside the custom mix sphere. In this manner, as the sound designer rotates their head spanning the azimuth, the sound output through the headset that the user hears changes, to reflect the new acoustic condition that the user is now directly facing a particular sound scene while the other sound scenes are either to the side or behind the is directly in front of the sound designers head.

Figure 2:
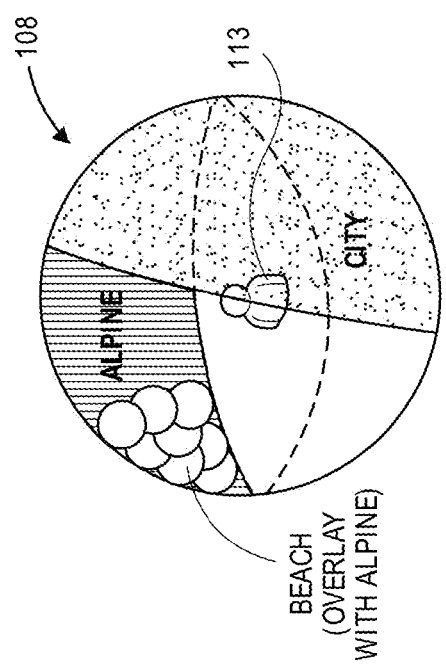
FIG. 2 shows an example of the custom mix sphere that represents (visualizes) the new spatial audio object having therein portions from three input objects.

FIG. 2 shows an example of where the scene combiner 208 has received a selection of a third input object, namely the object 102b that contains beach sound, and a selection of a third portion of the custom mix sphere where sound of the selected third input object is to be rendered. In this case, the third portion is at the far left edge of the front left upper quadrant (of the custom mix sphere), that is to the left of a listening position 113 which is depicted at the center of the custom mix sphere (by a user silhouette symbol). Note how the third portion overlaps a first portion which has been "painted" with the input object 102a (alpine sound). As a result, generating the new spatial audio object 108 in this case includes combining beach sound of the input object 102b with alpine sound of the input object 102a to be rendered at the third portion of the custom mix sphere (which overlaps some of the first portion). Of course, there is also a second portion that has been painted, namely the right hemisphere, with the input object 102c (city sound).

Figure 3:
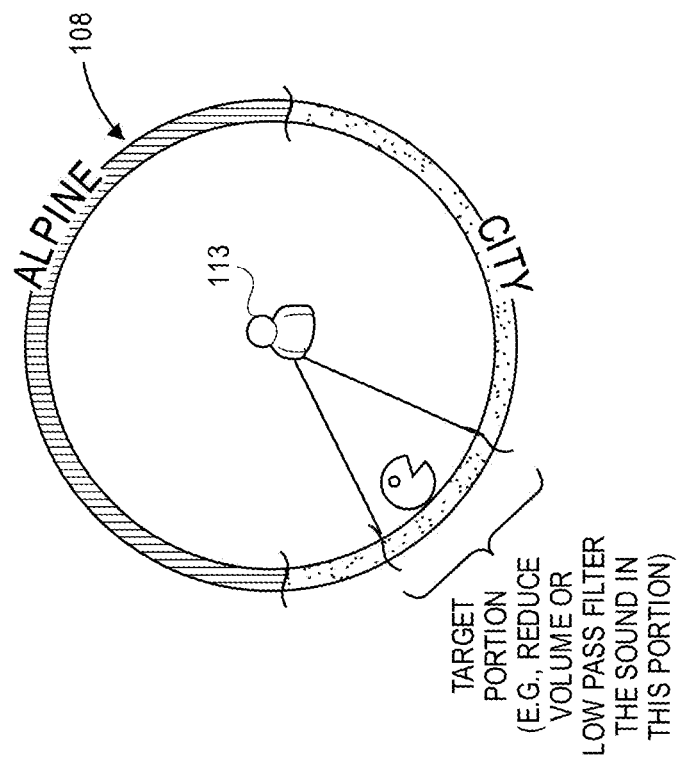
FIG. 3 shows a top view of the custom mix sphere of another example of the new spatial audio object, highlighting a target portion selected to receive a sound effect.

Turning now to FIG. 3, this figures shows a top view looking down into the custom mix sphere (representing the new spatial audio object 108) with the listening position 113 at the center, an upper half of the sphere painted with the alpine sound a lower half painted with the city sound. Consider also that there is a voice sound (represented by a small face symbol) that has been painted in the left quadrant of the city sound portion. If the sound designer wishes this voice sound to be more intelligible (at the listening position 113), then they could paint (or "shine a flashlight" on) a subset of the city sound portion around the position of the voice sound as shown, and designate it as a target portion where a particular sound effect is to be applied that is expected to make the voice sound more prominent. More generally, the scene combiner 208 in such an instance receives a change sound command, to change a sound of a target portion of the custom mix sphere. In response, the new spatial audio object 108 may be generated by defining a filter or a gain (in accordance with the change sound command)

that may be applied to the sound taken from any input spatial audio object that is to be rendered at the target portion (e.g., as specified in the change sound command). The filter may for example be a low pass filter that is specified to be applied only to the background or ambient sound, here the city sound, (rather than to the voice sound), thereby attenuating high frequency components of the target portion of the virtual sound source array. More generally, the change sound command may be as simple as for example reducing the sound volume (e.g., scalar gain) of a selected portion of a given virtual sphere, or it may be more complex and can include any type of timbral effects applied to the selected section of the virtual sphere, e.g. spectral shaping such as low pass filtering, dynamic range control, reverberation, etc.

Figure 4:
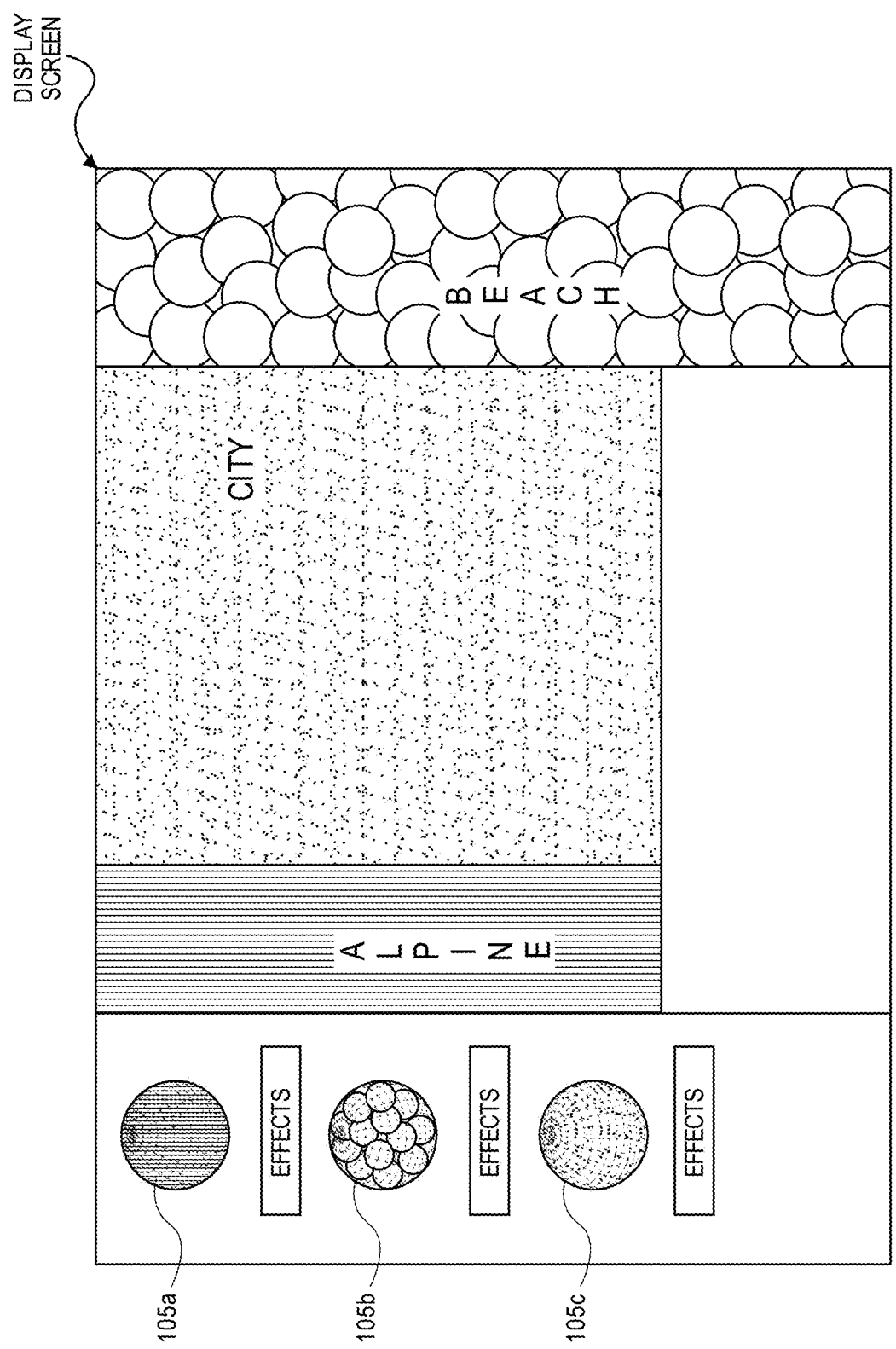
FIG. 4 shows an example display screen presented by a graphical user interface in a spatial sound upmixing process.

FIG. 4 illustrates an example of what is visualized to the sound designer on a display screen of a computer system, by the user interface 106. The left column pane contains visualizations of the available input audio objects 105a-105c, and these are selectable (e.g., via cursor control) by the user, and can be dragged and dropped onto the canvas of the sound field that is adjacent to the right. This canvas which represents the inside surface the custom mix sphere (see FIG. 1) has been painted by dragging the visualization of the city sounds (representing input object 105c) into a large square portion in the middle, and the visualization of the alpine sounds (representing input object 105a) adjacent to the left, and the visualization of the beach sounds (representing input object 105c) adjacent to the right, as shown. The resulting new spatial audio object 108 that is generated in accordance with the painting shown in FIG. 4 can be heard by the sound designer (e.g., binaurally rendered through a headset being worn by the sound designer), as if the sound designer were at the listening position 113 (see FIG. 3) at the center of a virtual sphere of sound (represented by the custom mix sphere as seen in FIG. 1).

Figure 5:
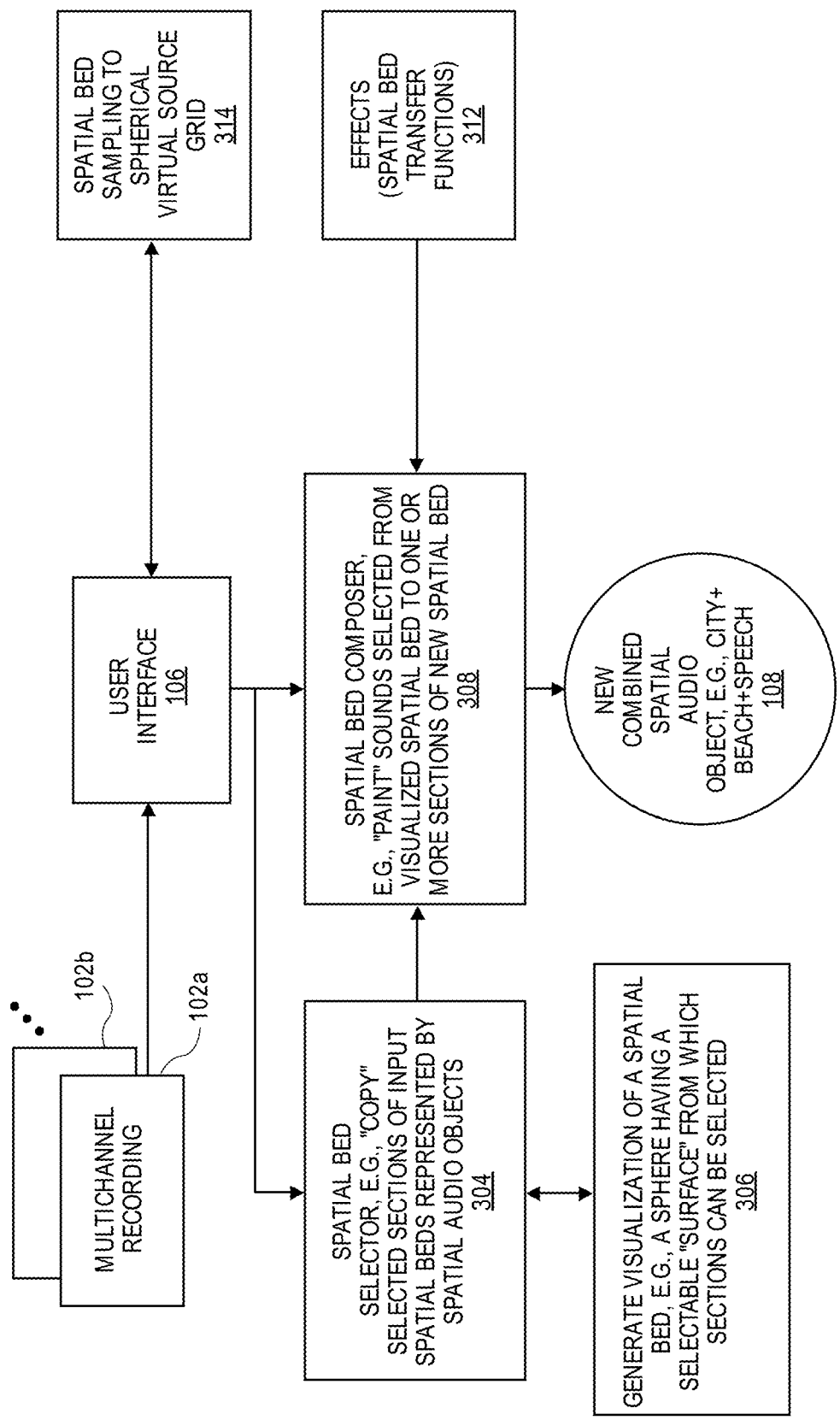
FIG. 5 is a block diagram illustrating a spatial sound upmixer process in accordance with one or more embodiments described herein.

FIG. 5 illustrates a process flow diagram of operations by a computer system for spatial sound upmixing. A spatial audio library has stored therein a variety of sound recordings 102a, 102b, . . . that have captured therein ambient sounds of various types of environments, e.g., beach, alpine, and city sound environments, as well perhaps mono recordings of for example speech. These might be available from a third party. A spatial bed sampling process 314 may be performed by the computer system, to sample a selected sound recording 102 onto a spherical, uniform grid of virtual sound sources, thereby generating an input spatial bed (e.g., a virtual sphere of sound). A process 306 generates a visualization of each spatial bed, e.g., as a globe (sphere) having an image associated with the sound recording 102, and a selectable surface from which sections or portions of the virtual sphere can be selected by a sound designer.

The user interface 106 which may be a graphical user interface serves to enable a sound designer to input commands for a spatial bed composer 308. These commands signal the composer 308 to select an input spatial bed (spatial bed selector 304). For example, a selected portion of an input spatial bed (or input spatial audio object 105—see FIG. 1) may be copied and painted onto one or more sections of a new spatial bed (operation 308). This may result in sounds being selected from several input spatial beds, and then combined into a single spatial audio object 108 (e.g., city, beach and speech sounds), in accordance with selections made by the sound designer via the user interface 106.

After at least two spatial beds have been sampled to a uniform grid and are thus available as spatial audio objects 105, the spatial bed composer 308 generates (operation 306) a visualization of each spatial bed that can be presented to a user via a spatial bed composer interface (e.g., the interface 106), such as a visualization as a globe having a selectable surface from which the user, such as a sound designer, can select sections of the virtual sphere of sound or spatial bed for composition into a new spatial bed. For example, a spatial bed selector 304 can be configured to copy selected sections of the spatial beds.

In one embodiment the new spatial bed being created is also presented to the user as a custom mix sphere onto which the selected sections of the input spatial beds can be copied as visualizations, using the spatial bed composer 308. For example, the spatial bed composer 308 enables the user to "paint" sounds selected and copied from one visualized spatial bed to one or more sections of the new visualized spatial bed. Once all of the desired sections of the visualized spatial beds have been copied to the new visualized spatial bed, a new combined spatial audio object 108 may be generated as a result.

In one embodiment, an effects operation 312 enables the sound designer to set a per channel level (gain adjustment) or a per channel transfer function (filter) that is to be applied to a given input spatial bed, that has been selected to be combined into the new spatial audio object 108. This allows the new spatial audio object 108 to be created with any one or more desired sound effects being applied to its constituent, input spatial beds. In this manner, the spatial audio upmixing enables per channel mixing of input spatial audio objects at a per-channel level of granularity to form a new spatial audio object, for greater flexibility than is possible with conventional sound mixing.

In one embodiment, the spatial bed composer 308 is further configured to enable the sound designer to add a speech sound element (voice sound) that is available in a recording 102 that has been sampled onto the uniform grid (to create a spatial bed or an input spatial audio object of voice sound). Similar to other input spatial objects, the voice sound object may be added or painted onto one or more selected portions of the custom mix sphere (representing the new spatial audio object 108). The end result is the composed spatial audio object 210 which is suitable for rendering by for example a binaural render engine 214 or other spatial audio renderer, to output 3D sound.

The systems and methods described herein can be implemented in a variety of different data processing systems and devices, such as server systems, desktop computers, laptop computers, embedded electronic devices, or consumer electronic devices. It will be apparent from this description that aspects of the present invention may be embodied, at least in part, in software. That is, the techniques may be carried out in a data processing system in response to its one or more processors (generically referred to here as "a processor") executing a sequence of instructions contained in a storage medium, such as a non-transitory machine-readable storage medium (e.g. DRAM or flash memory). In various embodiments, hardwired circuitry may be used in combination with software instructions to implement the present invention. Thus, the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method for creating a custom mix of different spatial audio objects, the method comprising the following operations performed by a computer:
   receiving a selection of a first input spatial audio object and a first portion of the first input spatial audio object;
   receiving a selection of a first portion of a custom mix visualization where sound of the first input spatial audio object is to be rendered;
   receiving a selection of a second input spatial audio object;
   receiving a selection of a second portion of the custom mix visualization where sound of the second input spatial audio object is to be rendered; and
   generating a new spatial audio object that represents an array of virtual sound sources that define a sound field of the new spatial audio object, wherein
   the first input spatial audio object represents a first array of virtual sound sources that i) defines a sound field of the first input spatial audio object and ii) has the same virtual sound source grid as the array of the virtual sound sources of the new spatial audio object,
   the first portion of the first input spatial audio object comprises a selected portion of the first array, and
   the selected portion of the first array becomes a corresponding portion of the array of virtual sound sources of the new spatial audio object.

2. The computer-implemented method of claim 1, wherein the custom mix visualization is a globe, and wherein the array of virtual sound sources is a spherical array of virtual sound sources.

3. The computer-implemented method of claim 2, wherein the selected first portion has an irregular spherical shape.

4. The computer-implemented method of claim 2, wherein the selected first portion is an outer surface of a spherical wedge.

5. The computer-implemented method of claim 2, wherein the selected first portion is an outer surface of a spherical sector.

6. The computer-implemented method of claim 1, further comprising
   receiving a selection of a third input spatial audio object; and
   receiving a selection of a third portion of the custom mix visualization where sound of the third input object is to be rendered, wherein the third portion overlaps the first portion, and wherein generating the new spatial audio object comprises combining sound of the third input object with sound of the first input object to be rendered at the third portion of the custom mix visualization.

7. The computer implemented method of claim 1 further comprising
   receiving a change sound command to change a sound of a target portion of the custom mix visualization, wherein generating the new spatial audio object comprises defining a filter or a gain in accordance with the change sound command that is to be applied to the sound of any input object that is to be rendered at the target portion.

8. The computer-implemented method of claim 1, further comprising:
   upsampling a multichannel audio recording onto the first array of virtual sound sources being a uniformly spaced spherical grid to generate the first input spatial audio object.

9. The computer-implemented method of claim 1 further comprising
   rendering the new spatial audio object for output as spatial sound by a speaker system.

10. The computer-implemented method of claim 1 further comprising
    binaural rendering the new spatial audio object for output as spatial sound through headphones.

11. The computer-implemented method of claim 1 further comprising
    generating a visualization of each of the first and second input spatial audio objects as a globe whose outer skin has an image representative of a recorded sound scene captured in the input spatial audio object.

12. The computer-implemented method of claim 1 wherein each of the first and second input spatial audio objects comprises multichannel audio content that has been projected onto an N-element spherical grid array of virtual sound sources that define a sound field surrounding a central listening position of said each of the first and second input spatial audio objects, the new spatial audio object comprises an N-element spherical grid array of virtual sound sources, and generating the new spatial audio object comprises performing a matrix sum of the virtual sound sources in the first and second input audio objects.

13. A computer system for creating a custom mix of different of spatial audio objects, the computer system comprising
    a processor and memory having stored therein instructions that configure the processor to:
    receive a selection of a first input spatial audio object;
    receive a selection of a first portion of a custom mix visualization where sound of the first input spatial audio object is to be rendered;
    receive a selection of a second input spatial audio object;
    receive a selection of a second portion of the custom mix visualization where sound of the second input spatial audio object is to be rendered; and
    generate a new spatial audio object that represents an array of virtual sound sources that define a sound field of the new spatial audio object, wherein
    the first input spatial audio object represents a first array of virtual sound sources that i) defines a sound field of the first input spatial audio object and ii) has the same virtual sound source grid as the array of the virtual sound sources of the new spatial audio object,
    the first portion of the first input spatial audio object comprises a selected portion of the first array, and
    the selected portion of the first array becomes a corresponding portion of the array of virtual sound sources of the new spatial audio object.

14. The computer system of claim 13, wherein the custom mix visualization is a globe, and wherein the array of virtual sound sources is a spherical array of virtual sound sources.

15. The computer system of claim 14, wherein the selected first portion has an irregular spherical shape.

16. The computer system of claim 13 wherein the memory has further instructions stored therein that when executed by the processor:
   receive a selection of a third input spatial audio object; and
   receive a selection of a third portion of the custom mix visualization where sound of the third input object is to be rendered, wherein the third portion overlaps the first portion, and wherein generating the new spatial audio object comprises combining sound of the third input object with sound of the first input object to be rendered at the third portion of the custom mix visualization.

17. The computer system of claim 13 wherein the memory has further instructions stored therein that when executed by the processor:
   receive a change sound command to change a sound of a target portion of the custom mix visualization, wherein generating the new spatial audio object comprises defining a filter or a gain in accordance with the change sound command that is to be applied to the sound of an input object that is to be rendered at the target portion.

18. The computer system of claim 13 wherein the memory has stored therein further instructions that when executed by the processor
   upsample a multichannel audio recording onto the first array of virtual sound sources being a uniformly spaced spherical grid, to generate the first input spatial audio object.

19. The computer system of claim 13 wherein the memory has stored therein further instructions that when executed by the processor
   render the new spatial audio object for output as spatial sound by a speaker system.

20. The computer system of claim 13 wherein the memory has stored therein further instructions that when executed by the processor
   perform binaural rendering of the new spatial audio object for output as spatial sound through headphones.

21. The computer system of claim 13 wherein the memory has stored therein further instructions that when executed by the processor
   generate a visualization of each of the first and second input spatial audio objects as a globe whose outer skin has an image representative of a recorded sound scene captured in the input spatial audio object.

22. The computer system of claim 13 wherein each of the first and second input spatial audio object comprises multi-channel audio content that has been projected onto an N-element spherical grid array of virtual sound sources that define a sound field surrounding a central listening position of the respective spatial audio object, the new spatial audio object comprises an N-element spherical grid array of virtual sound sources, and generating the new spatial audio object comprises performing a matrix sum of the virtual sound sources in the first and second input audio objects.

* * * * *